Patented Mar. 9, 1954

2,671,803

UNITED STATES PATENT OFFICE 2,671,803

DEHALOGENATION OF HALOGENO ACETIC ACIDS BY HYDROGENATION

Kurt Sennewald, Knapsack Kreis Koln, and Arthur Wolfram, Frankfurt, Germany, assignors to Knapsack-Griesheim Aktiengesellschaft, Knapsack, near Koln, Germany, a company of Germany No Drawing. Application March 11, 1952, Serial No. 276,064

Claims priority, application Germany March 12, 1951

5 Claims. (Cl. 260—539)

1

The present invention relates to a process of dehalogenation of halogeno acetic acids by hydrogenation.

In the manufacture of monochloro acetic acid by subjecting acetic acid to the action of chlorine, dichloro acetic acid and trichloro acetic acid are simultaneously formed in minor quantities. Since a small part only of the latter compounds can be utilized for the preparation of other products, the two higher chlorinated acetic acids represent troublesome waste products. Attempts have been made to convert the total excess amount of these by-products by further chlorination into trichloro acetic acid and to prepare therefrom chloroform and carbon dioxide. However, the commercial utility of such a process is handicapped since cheaper methods of producing chloroform are available.

According to the present invention halogeno acetic acids are converted into acetic acids of lower halogen contents by hydrogenation in the presence of suitable catalysts, the halogeno acetic acids being used in form of vapor. The term "halogeno acetic acids" as used throughout the specification shall preferably comprise trichloro- and dichloro acetic acid as well as the respective bromo acetic acids.

The process of the present invention may be most advantageously adapted to the commercial utilization of the higher chlorinated by-products formed in the manufacture of monochloro acetic acid.

Hydrogenation of halogenated acetic acids already proceeds at ordinary temperature, if the acids are present in aqueous solution or aqueous suspension. However, this process displays the disadvantage that regeneration of the catalysts involves certain difficulties and losses of contact material cannot be avoided.

We have found that such drawbacks are avoided if the hydrogenation is carried out in the vapor phase at elevated temperatures and in the absence of water.

Since the application of higher temperatures may involve losses due to the splitting off of carbon dioxide, it is not advisable to carry out the hydrogenation reaction at temperatures exceeding about 250° C. Working temperatures of about 180° C to about 250° C. are preferably applied. Suitable catalysts for use in the process of the invention are many of the well-known hydrogenation catalysts, especially metals of the platinum group, i. e. platinum, iridium, ruthenium, rhodium, palladium or osmium, said metals being employed either alone or in combination with each other or as alloys.

2

It has proved to be of special advantage to deposit the metal used as catalyst, for instance palladium, on a carrier. The activity of the catalyst is increased by as fine a distribution as possible. A suitable carrier is, e. g., absorption charcoal; the best hydrogenating action of the catalyst is, however, attained with silica gel. Good hydrogenation action is achieved by means of such a catalyst, even when used in comparatively small quantities only, for instance 1%, calculated on the volume of the carrier. The minimum quantity of catalyst applied amounts to about 0.1 gram per 100 cc. of contact; the optimum quantity is about 0.25 gram per 100 cc. of contact. If a still larger portion of catalyst is present, the hydrogenating action is further increased, so that even more acetic acid is formed. The time of dwell may amount to about 2-6 seconds; as a rule, about 4 seconds are suitable.

The catalysts which gradually become inactive in the hydrogenation process may be easily regenerated by means of air or dilute oxygen at about 200° C. to about 250° C., and, thereafter, may be re-used over and over again. It is of advantage to perform the regeneration directly in the contact chamber.

Though hydrogenation proceeds smoothly at a raised pressure, excellent yields are already attained on operating at normal or slightly elevated pressure, so that the application of higher pressure is not required for technical reasons. The superatmospheric pressure amounts to, for instance, 1.4-4 mm. of mercury when the hydrogen is introduced, and to about 0-1 mm. of mercury when the hydrogen leaves the reaction chamber. This pressure is required in order to overcome the current resistance which is produced by the catalyst.

The reaction is promoted and the yield improved by circulating the hydrogen used in the process of the invention and employing a large excess of the theoreticallly required amount of hydrogen. If vaporous halogeno acetic acid is used, at least twice the theoretical quantity of hydrogen is required; during the practical operating about 10-15 times the quantity is used. A multiple of the excess of hydrogen does no harm. When there is operated in an aqueous solution, the theoretical quantity of hydrogen may be sufficient.

The invention constitutes a great technical advance in that it provides a convenient and simple method of preparing technically valuable products from previously useless excess dichloro acetic acid and trichloro acetic acid.

The following examples specifically illustrate the aspect of the invention relating to the dehalogenation of di- and triacetic acid, however, without limiting the invention thereto, the parts being by weight:

Example 1

The catalyst prepared by depositing palladium on granular silica gel, i. e. in a quantity of about 1% by weight, calculated on the volume of the carrying substance, is filled into a reaction tube so as to form therein a loose, porous mass through which the reaction gases may easily pass. A by-product mixture formed in the manufacture of monochloro acetic acid, which consists of about 42.5 parts of monochloro acetic acid, 51.5 parts of dichloro acetic acid, small quantities of trichloro acetic acid and 4.1 parts of acetic acid, is vaporized in an evaporator and, together with hydrogen, is introduced over a preheating device into the reaction tube, the temperature being kept at about 200° C. The resulting gas or vaporous reaction product passes over a water cooler into a receiver where the greater part of the liquid and solid reaction products separates. After passing a brine cooler where the unreacted hydrogen and the hydrogen chloride formed in the hydrogenation reaction are cooled to about −5° C. and the residual parts of the liquid and solid reaction products are precipitated, the gases are conducted to a washing tower where they are trickled over with water and liberated for the most part from the hydrogen chloride formed in the hydrogenation reaction with water. After replenishing the quantity of hydrogen consumed in the reaction, the hydrogen thus recovered is circulated and introduced again into the reaction tube. The solid and liquid reaction products consisting of about 6.80 per cent. of monochloro acetic acid, 0.02 per cent. of dichloro acetic acid, 70.70 per cent. of acetic acid and 8.83 per cent. of hydrogen chloride, collect in the receiver. The yield of acetic acid amounts to above 90 per cent. calculated on the starting materials and the reaction products obtained in the hydrogenation reaction.

During an operating time of one week the composition of the reaction mixture in regard to dichloro acetic acid scarcely changes. After that time the reaction mixture shows the following composition: 74.2 per cent. of monochloro acetic acid, 0.06 per cent. of dichloro acetic acid, 21.8 per cent. of acetic acid and 0.03 per cent. of hydrogen chloride. After continuous operation for a fortnight, a higher portion of dichloro acetic acid escapes unchanged. Upon regenerating, however, the catalyst by passing over dilute oxygen in the reaction tube at a temperature of about 200° C. to 250° C., the reaction mixture shows again the composition first indicated above.

The process of the present invention has been described with particular reference to di- and trichloro acetic acids, however, it is to be understood that other halogeno acetic acids, particularly bromo acetic acid, may also be dehalogenated according to the invention without departing from the spirit and scope thereof, and, therefore, it is not intended to be limited except as indicated by the appended claims.

Example 2

10 parts of dichloro acetic acid of 95 per cent. strength are dissolved in 90 parts of water and the solution is shaken at room temperature in a hydrogen atmosphere, while adding 0.1 gram of palladium asbestos of 25 per cent. strength. After 23 hours 93 per cent. of the theoretical quantity of hydrogen required for the hydrogenation of monochloro acetic acid, has been taken up. The product chiefly consists of monochloro acetic acid containing small quantities of acetic acid.

We claim:

1. A process of dehalogenating of a halogeno acetic acid which comprises passing said acid in the form of vapor in the presence of hydrogen over a catalyst selected from the group consisting of the metals of the platinum group at temperatures of about 180° C. to about 250° C.

2. A process as claimed in claim 1, wherein the catalyst is deposited on a carrier.

3. A process as claimed in claim 1, wherein the reaction is carried out at superatmospheric pressure.

4. A process as claimed in claim 1, wherein a mixture of higher chlorinated acetic acids obtained as a by-product in the manufacture of monochloro acetic acid is dehalogenated.

5. A process of dehalogenating of a halogeno acetic acid which comprises passing said acid in the form of vapor at temperatures of about 180° C. to about 250° C. in the presence of hydrogen over a catalyst consisting of palladium deposited on granular silica gel.

KURT SENNEWALD.
ARTHUR WOLFRAM.

References Cited in the file of this patent

Sabatier et al., Chem. Zentr., 1920 I, page 523.
Baltzly et al., J. Am. Chem. Soc., vol. 68, pp. 261–5 (1946).
Houben, Die. Methoden der Org. Chem., 3rd. ed., vol II, pp. 504–5 (1943).